(12) United States Patent
Chabalko et al.

(10) Patent No.: US 12,476,497 B2
(45) Date of Patent: Nov. 18, 2025

(54) WIRELESS POWER SYSTEMS WITH MAGNETIC ALIGNMENT SYSTEMS

(71) Applicant: Apple Inc., Cupertino, CA (US)

(72) Inventors: Matthew J Chabalko, Salinas, CA (US); Zaki Moussaoui, San Carlos, CA (US)

(73) Assignee: Apple Inc., Cupertino, CA (US)

(*) Notice: Subject to any disclaimer, the term of this patent is extended or adjusted under 35 U.S.C. 154(b) by 872 days.

(21) Appl. No.: 17/731,094

(22) Filed: Apr. 27, 2022

(65) Prior Publication Data

US 2022/0416591 A1    Dec. 29, 2022

Related U.S. Application Data

(60) Provisional application No. 63/213,923, filed on Jun. 23, 2021.

(51) Int. Cl.
*H02J 50/90*    (2016.01)
*H01F 7/02*    (2006.01)
(Continued)

(52) U.S. Cl.
CPC ............ *H02J 50/90* (2016.02); *H01F 7/0247* (2013.01); *H01R 13/6205* (2013.01);
(Continued)

(58) Field of Classification Search
CPC .. H01F 7/0247; H01R 13/6205; H02J 50/005; H02J 50/90
(Continued)

(56) References Cited

U.S. PATENT DOCUMENTS

| 4,758,813 | A | | 7/1988 | Holsinger et al. |
| 5,909,100 | A | * | 6/1999 | Watanabe ............. B60L 53/126 320/108 |

(Continued)

FOREIGN PATENT DOCUMENTS

| CN | 212304889 U | 1/2021 |
| CN | 112865343 A | 5/2021 |

(Continued)

OTHER PUBLICATIONS

Korean Patent Application No. 10-2022-0065980, Office Action, Mailed on Dec. 13, 2024, 4 pages.
(Continued)

*Primary Examiner* — John T Trischler
(74) *Attorney, Agent, or Firm* — Treyz Law Group, P.C.; Joseph F. Guihan (57) ABSTRACT

A wireless power system has electronic devices that mate with each other to transfer wireless power. Each device may have a wireless power coil. Alignment magnets may be used to magnetically attach devices to each other so that the coils in the devices are aligned with respect to each other for wireless power transfer. The system may include first, second, and third devices. The first and third devices may have fixed alignment magnets with poles of opposite magnetic polarity that allow the first and third devices to be attached to each other so that their coils are aligned. The second device may have a reconfigurable alignment magnet that is operable in a first mode in which the second device is magnetically attached to the first device and a second mode in which the second device is magnetically attached to the third device.

11 Claims, 8 Drawing Sheets

(51) Int. Cl.
  *H01R 13/62* (2006.01)
  *H02J 50/00* (2016.01)
  *H01F 38/14* (2006.01)
  *H02J 7/00* (2006.01)
  *H02J 50/10* (2016.01)

(52) U.S. Cl.
  CPC ............ *H02J 50/005* (2020.01); *H01F 38/14* (2013.01); *H02J 7/0042* (2013.01); *H02J 7/0044* (2013.01); *H02J 7/0045* (2013.01); *H02J 50/10* (2016.02)

(58) Field of Classification Search
  USPC .......................................... 320/108; 307/104
  See application file for complete search history.

(56) References Cited

U.S. PATENT DOCUMENTS

| | | | | |
|---|---|---|---|---|
| 6,331,744 B1* | 12/2001 | Chen | ...................... | H02K 35/02 310/46 |
| 6,657,351 B2* | 12/2003 | Chen | ...................... | H02K 21/12 310/104 |
| 8,143,983 B1* | 3/2012 | Lauder | ...................... | G06T 1/00 335/304 |
| 8,169,185 B2* | 5/2012 | Partovi | ................. | H01F 27/366 320/108 |
| 8,242,868 B2* | 8/2012 | Lauder | ...................... | H01F 7/04 335/304 |
| 8,390,412 B2* | 3/2013 | Lauder | ................. | G06F 1/1626 361/679.01 |
| 8,514,042 B2* | 8/2013 | Lauder | ................. | H01F 7/0263 335/304 |
| 8,629,654 B2* | 1/2014 | Partovi | ................... | H02J 50/12 320/108 |
| 8,688,037 B2* | 4/2014 | Chatterjee | ............ | G06F 1/1632 359/214.1 |
| 8,766,484 B2* | 7/2014 | Baarman | ................. | H04B 5/00 307/104 |
| 8,781,794 B2* | 7/2014 | Harrison | ............ | G02B 27/0012 703/1 |
| 8,829,731 B2* | 9/2014 | Baarman | ................. | H04B 5/00 307/104 |
| 8,890,470 B2* | 11/2014 | Partovi | ................... | H02J 7/0044 320/108 |
| 8,896,264 B2* | 11/2014 | Partovi | ............... | H02J 7/00034 320/108 |
| 8,901,881 B2* | 12/2014 | Partovi | ................... | H02J 50/80 320/108 |
| 8,928,437 B2* | 1/2015 | Lauder | ...................... | H01F 7/04 361/679.01 |
| 8,947,047 B2* | 2/2015 | Partovi | ................. | H02J 7/0013 320/108 |
| 9,099,867 B2 | 8/2015 | Park | | |
| 9,106,083 B2* | 8/2015 | Partovi | ................... | H02J 50/12 |
| 9,112,362 B2* | 8/2015 | Partovi | ................. | B60L 53/124 |
| 9,112,363 B2* | 8/2015 | Partovi | ................... | H02J 50/12 |
| 9,112,364 B2* | 8/2015 | Partovi | ...................... | H02J 7/00 |
| 9,178,369 B2* | 11/2015 | Partovi | ................... | H02J 50/10 |
| 9,225,193 B2* | 12/2015 | Yeh | ......................... | H02J 50/10 |
| 9,276,437 B2* | 3/2016 | Partovi | ................. | H02J 7/0044 |
| 9,287,718 B2* | 3/2016 | Kari | ................... | H02J 7/00047 |
| 9,601,943 B2* | 3/2017 | Partovi | ..................... | H02J 7/00 |
| 9,614,378 B2* | 4/2017 | Golko | ........................ | H02J 50/90 |
| 9,681,759 B2* | 6/2017 | Schwalbach | .......... | H02J 7/0044 |
| 9,853,507 B2* | 12/2017 | Jol | ........................... | H02J 50/10 |
| 9,941,627 B2* | 4/2018 | Esmaeili | ............. | H01R 13/5213 |
| 10,044,229 B2* | 8/2018 | Partovi | ................... | H01F 38/14 |
| 10,141,770 B2* | 11/2018 | Partovi | ................. | B60L 53/126 |
| 10,164,688 B2* | 12/2018 | Rothkopf | ............... | G01R 33/02 |
| 10,230,256 B2* | 3/2019 | Uhm | ...................... | H02J 50/10 |
| 10,273,942 B2 | 4/2019 | Nakamura | | |
| 10,381,884 B2* | 8/2019 | Shaw | ...................... | H02J 50/90 |
| 10,404,089 B2* | 9/2019 | Kasar | ...................... | H02J 50/10 |
| 10,505,386 B2* | 12/2019 | Kasar | ................. | H04M 1/72412 |
| 10,714,986 B2* | 7/2020 | Partovi | ................. | H01F 7/0252 |
| 10,725,515 B2 | 7/2020 | Marshall et al. | | |
| 10,868,436 B1* | 12/2020 | Chen | ................... | H01M 50/296 |
| 10,886,769 B2* | 1/2021 | Kasar | ...................... | G06F 1/266 |
| 10,886,771 B2* | 1/2021 | Kasar | ...................... | H02J 7/0042 |
| 10,938,147 B2* | 3/2021 | Esmaeili | ................ | H01R 13/22 |
| 10,938,251 B1 | 3/2021 | Mehrabi et al. | | |
| 10,958,103 B2* | 3/2021 | Langlois | ................. | H02J 7/0013 |
| 10,965,162 B2* | 3/2021 | Pinciuc | ................... | H01F 38/14 |
| 11,031,164 B2* | 6/2021 | Marshall | ................. | G06F 1/266 |
| 11,031,818 B2* | 6/2021 | Danilovic | ................ | H02H 3/44 |
| 11,043,844 B2* | 6/2021 | Langlois | ................. | H02J 7/0013 |
| 11,043,848 B2* | 6/2021 | Danilovic | ................ | H02H 3/38 |
| 11,121,590 B1* | 9/2021 | Patel | ................... | G06K 19/0723 |
| 11,159,065 B2* | 10/2021 | Bossetti | ................. | H02J 50/12 |
| 11,165,273 B2* | 11/2021 | Graham | ................ | H01F 27/36 |
| 11,201,500 B2* | 12/2021 | Partovi | ................. | H02J 7/00041 |
| 11,211,819 B2* | 12/2021 | Ng | ...................... | H01F 38/14 |
| 11,211,975 B2* | 12/2021 | Partovi | ................... | H02J 5/00 |
| 11,283,306 B2* | 3/2022 | Partovi | ................... | H02J 50/90 |
| 11,316,371 B1* | 4/2022 | Partovi | ................... | G06F 1/1635 |
| 11,342,792 B2* | 5/2022 | Partovi | ................... | G06F 1/1635 |
| 11,342,800 B2* | 5/2022 | Oro | ...................... | H02J 50/90 |
| 11,349,315 B2* | 5/2022 | Partovi | ................... | G06F 1/1683 |
| 11,387,674 B1* | 7/2022 | Alam | ...................... | H02J 50/90 |
| 11,387,684 B1* | 7/2022 | Alam | ...................... | H02J 50/90 |
| 11,404,909 B2* | 8/2022 | Partovi | ................... | H02J 50/12 |
| 11,411,433 B2* | 8/2022 | Partovi | ................... | H02J 50/10 |
| 11,462,942 B2* | 10/2022 | Partovi | ................... | H02J 50/12 |
| 11,476,711 B2* | 10/2022 | Alam | ...................... | H02J 50/12 |
| 11,545,856 B2* | 1/2023 | Mehrabi | ................. | H02J 50/50 |
| 11,569,685 B2* | 1/2023 | Partovi | ................... | H02J 50/05 |
| 11,588,351 B2* | 2/2023 | Danilovic | ................ | H02H 7/1252 |
| 11,606,119 B2* | 3/2023 | Partovi | ................... | H02J 7/00304 |
| 11,637,448 B1* | 4/2023 | Luzinski | ................ | H01F 38/14 307/142 |
| 11,637,452 B2* | 4/2023 | Danilovic | ............... | H02J 50/80 320/108 |
| 11,670,965 B2* | 6/2023 | Lee | .......................... | H04B 5/79 307/104 |
| 11,700,472 B1* | 7/2023 | Sjoeroos | ................. | H02J 50/402 320/108 |
| 11,710,984 B2* | 7/2023 | Qiu | ...................... | H01F 27/366 307/149 |
| 11,710,988 B2* | 7/2023 | Larsson | ................... | H04B 5/77 320/108 |
| 11,710,989 B2* | 7/2023 | Thompson | .............. | H02J 50/80 320/108 |
| 11,715,965 B2* | 8/2023 | Wu | ........................ | H02J 50/10 320/108 |
| 11,715,983 B2* | 8/2023 | Larsson | ............... | H02J 7/00034 320/108 |
| 11,722,013 B1* | 8/2023 | Chaudhri | ................ | H02J 50/12 455/41.1 |
| 11,722,015 B2* | 8/2023 | Walton | .................... | H04B 5/79 320/108 |
| 11,722,016 B2* | 8/2023 | Jol | ........................... | H04B 5/26 320/108 |
| 11,771,910 B2* | 10/2023 | Agnew | .................... | H02J 7/02 607/35 |
| 11,784,511 B2* | 10/2023 | Liu | ....................... | G06F 3/0383 320/108 |
| 11,826,637 B2* | 11/2023 | Chen | ..................... | H02J 50/10 |
| 11,831,179 B2* | 11/2023 | Alam | ..................... | H02J 50/12 |
| 11,837,875 B2* | 12/2023 | Alam | ..................... | H02J 50/12 |
| 11,838,714 B1* | 12/2023 | Sjoeroos | ................ | H02J 50/10 |
| 11,839,279 B2* | 12/2023 | Wulff | ...................... | H01F 7/0252 |
| 11,862,985 B2* | 1/2024 | Louis | ...................... | H01F 7/0247 |
| 11,867,352 B2* | 1/2024 | Rasmussen | ........... | H02J 7/0044 |
| 11,902,458 B2* | 2/2024 | Whitten | ................... | F16M 13/00 |
| 11,909,248 B2* | 2/2024 | Xu | ........................ | H02J 7/0042 |
| 11,962,165 B2* | 4/2024 | Alam | ..................... | H02J 50/70 |
| 11,967,830 B2* | 4/2024 | Alam | ..................... | H01F 27/366 |
| 12,003,121 B2* | 6/2024 | Bossetti | .................. | G01D 5/16 |
| 12,014,857 B2* | 6/2024 | Moussaoui | ............. | H01F 27/24 |
| 12,027,873 B2* | 7/2024 | Partovi | ................... | H02J 50/10 |
| 12,040,625 B2* | 7/2024 | Partovi | ................... | G06F 1/1683 |

(56) References Cited

U.S. PATENT DOCUMENTS

| | | | | |
|---|---|---|---|---|
| 12,040,643 | B2* | 7/2024 | Karanikos | H02J 50/10 |
| 12,068,622 | B2* | 8/2024 | Fieldbinder | H02J 7/00045 |
| 12,070,612 | B2* | 8/2024 | Hernandez | A61N 1/3787 |
| 12,081,035 | B2* | 9/2024 | Haug | H02J 50/90 |
| 12,095,279 | B2* | 9/2024 | Louis | H01F 1/34 |
| 12,100,968 | B2* | 9/2024 | Shi | H02J 50/40 |
| 12,126,193 | B2* | 10/2024 | Larsson | H02J 50/10 |
| 12,126,194 | B2* | 10/2024 | Thompson | H02J 7/00034 |
| 12,132,325 | B2* | 10/2024 | Luzinski | H04B 5/79 |
| 12,132,327 | B2* | 10/2024 | Powell, Jr. | H02J 50/90 |
| 12,149,093 | B2* | 11/2024 | Qiu | H02J 50/005 |
| 12,249,843 | B2* | 3/2025 | Chaudhri | H02J 50/90 |
| 12,250,333 | B2* | 3/2025 | Whitten | F16M 13/022 |
| 12,261,449 | B2* | 3/2025 | Lin | H01F 3/08 |
| 12,278,045 | B2* | 4/2025 | Partovi | H02J 50/70 |
| 12,288,635 | B2* | 4/2025 | Moussaoui | H02J 7/02 |
| 12,293,872 | B2* | 5/2025 | Partovi | H02J 50/90 |
| 12,300,837 | B2* | 5/2025 | Havskjold | H01M 50/284 |
| 12,301,027 | B2* | 5/2025 | Larsson | H02J 7/0042 |
| 12,308,670 | B2* | 5/2025 | Patel | H02J 50/90 |
| 12,308,671 | B2* | 5/2025 | Patel | H02J 7/02 |
| 12,368,322 | B2* | 7/2025 | Karanikos | H02J 50/10 |
| 2001/0045785 | A1* | 11/2001 | Chen | H02K 35/02, 310/104 |
| 2003/0030342 | A1* | 2/2003 | Chen | H02K 21/24, 310/40 MM |
| 2009/0096413 | A1* | 4/2009 | Partovi | H02J 7/0013, 320/108 |
| 2009/0212637 | A1* | 8/2009 | Baarman | H02J 50/70, 307/104 |
| 2010/0081377 | A1* | 4/2010 | Chatterjee | G06F 1/1632, 455/41.1 |
| 2011/0050164 | A1* | 3/2011 | Partovi | H02J 50/12, 320/108 |
| 2012/0066873 | A1* | 3/2012 | Lauder | H01F 7/04, 703/1 |
| 2012/0069503 | A1* | 3/2012 | Lauder | G06T 1/00, 361/679.01 |
| 2012/0069540 | A1* | 3/2012 | Lauder | G06T 1/00, 361/807 |
| 2012/0123742 | A1* | 5/2012 | Harrison | G02B 27/0172, 703/1 |
| 2012/0146576 | A1* | 6/2012 | Partovi | H02J 50/12, 320/108 |
| 2012/0181876 | A1* | 7/2012 | Baarman | H01F 7/0247, 324/207.13 |
| 2012/0206088 | A1* | 8/2012 | Park | H01F 7/0247, 320/112 |
| 2012/0235636 | A1* | 9/2012 | Partovi | H02J 7/0042, 320/108 |
| 2012/0256585 | A1* | 10/2012 | Partovi | H01F 27/366, 320/108 |
| 2012/0300383 | A1* | 11/2012 | Lauder | G06F 1/1647, 206/320 |
| 2013/0093388 | A1* | 4/2013 | Partovi | H02J 50/80, 320/108 |
| 2013/0093389 | A1* | 4/2013 | Partovi | H02J 50/80, 320/108 |
| 2013/0093390 | A1* | 4/2013 | Partovi | H01F 38/14, 320/108 |
| 2013/0099735 | A1* | 4/2013 | Partovi | H02J 50/90, 320/108 |
| 2013/0119927 | A1* | 5/2013 | Partovi | H04B 5/79, 320/108 |
| 2013/0119928 | A1* | 5/2013 | Partovi | H02J 50/70, 320/108 |
| 2013/0119929 | A1* | 5/2013 | Partovi | H02J 50/80, 320/108 |
| 2013/0162668 | A1* | 6/2013 | Lauder | G06F 1/1626, 345/619 |
| 2013/0175983 | A1* | 7/2013 | Partovi | H02J 7/0044, 320/108 |
| 2013/0249308 | A1 | 9/2013 | Yeh | |
| 2013/0260677 | A1* | 10/2013 | Partovi | H02J 7/00302, 455/41.1 |
| 2014/0247004 | A1* | 9/2014 | Kari | H02J 7/00047, 320/108 |
| 2015/0091388 | A1* | 4/2015 | Golko | H02J 50/70, 307/104 |
| 2015/0102879 | A1* | 4/2015 | Jacobs | H01F 38/14, 335/294 |
| 2015/0130412 | A1* | 5/2015 | Partovi | H02J 50/70, 320/108 |
| 2015/0145475 | A1* | 5/2015 | Partovi | H02J 7/0042, 320/108 |
| 2015/0318100 | A1* | 11/2015 | Rothkopf | H04B 5/24, 361/170 |
| 2015/0318709 | A1* | 11/2015 | Jol | H02J 50/10, 307/104 |
| 2015/0325352 | A1 | 11/2015 | Lowe | |
| 2016/0056664 | A1* | 2/2016 | Partovi | B60L 53/122, 307/104 |
| 2016/0058206 | A1* | 3/2016 | Schwalbach | H02J 7/0013, 361/752 |
| 2016/0094076 | A1* | 3/2016 | Kasar | H02J 7/0042, 320/103 |
| 2016/0094078 | A1* | 3/2016 | Graham | H02J 50/50, 320/108 |
| 2016/0181860 | A1* | 6/2016 | Partovi | H02J 7/0044, 320/108 |
| 2017/0093087 | A1 | 3/2017 | Esmaeili et al. | |
| 2017/0170678 | A1 | 6/2017 | Uhm | |
| 2017/0194809 | A1* | 7/2017 | Partovi | H02J 50/70 |
| 2017/0257147 | A1 | 9/2017 | Szeto | |
| 2018/0123392 | A1* | 5/2018 | Pinciuc | H02J 7/0044 |
| 2018/0212455 | A1* | 7/2018 | Kasar | G06F 1/266 |
| 2018/0226747 | A1* | 8/2018 | Esmaeili | H01R 12/61 |
| 2018/0248406 | A1* | 8/2018 | Bae | H02J 7/02 |
| 2019/0006836 | A1* | 1/2019 | Danilovic | H02H 7/1252 |
| 2019/0006885 | A1* | 1/2019 | Danilovic | H02J 50/80 |
| 2019/0006893 | A1* | 1/2019 | Shaw | H02J 50/10 |
| 2019/0103764 | A1* | 4/2019 | Marshall | G06F 1/166 |
| 2019/0138073 | A1* | 5/2019 | Marshall | H02J 7/0044 |
| 2019/0190324 | A1* | 6/2019 | Bossetti | G01D 5/16 |
| 2019/0247669 | A1* | 8/2019 | Nielsen | A61B 5/6861 |
| 2019/0278349 | A1* | 9/2019 | Marshall | G06F 1/1656 |
| 2019/0305591 | A1* | 10/2019 | Ng | H02J 50/12 |
| 2019/0348864 | A1* | 11/2019 | Pinciuc | H04B 5/79 |
| 2019/0363565 | A1* | 11/2019 | Graham | H01F 27/36 |
| 2019/0372406 | A1* | 12/2019 | Partovi | H02J 50/12 |
| 2019/0386507 | A1* | 12/2019 | Kasar | H02J 7/342 |
| 2020/0044482 | A1* | 2/2020 | Partovi | H02J 50/12 |
| 2020/0059112 | A1* | 2/2020 | Langlois | H02J 7/0013 |
| 2020/0059114 | A1* | 2/2020 | Langlois | H02J 7/00036 |
| 2020/0112195 | A1* | 4/2020 | Kasar | H04M 1/72412 |
| 2021/0044147 | A9* | 2/2021 | Partovi | G06F 1/1635 |
| 2021/0050744 | A1* | 2/2021 | Qiu | H02J 50/10 |
| 2021/0099026 | A1* | 4/2021 | Larsson | H04B 5/263 |
| 2021/0099027 | A1 | 4/2021 | Larsson et al. | |
| 2021/0099028 | A1* | 4/2021 | Thompson | H02J 7/00034 |
| 2021/0099029 | A1* | 4/2021 | Oro | H02J 50/10 |
| 2021/0099030 | A1* | 4/2021 | Walton | H04B 5/79 |
| 2021/0099031 | A1 | 4/2021 | Jol et al. | |
| 2021/0104907 | A1* | 4/2021 | Chen | H01M 10/46 |
| 2021/0111591 | A1* | 4/2021 | Chaudhri | H02J 50/005 |
| 2021/0175749 | A1* | 6/2021 | Pinciuc | H02J 50/90 |
| 2021/0178170 | A1* | 6/2021 | Agnew | H02J 50/10 |
| 2021/0265861 | A1* | 8/2021 | Moussaoui | H02J 50/12 |
| 2021/0296933 | A1* | 9/2021 | Danilovic | H02H 3/38 |
| 2021/0296934 | A1* | 9/2021 | Danilovic | H02H 7/1252 |
| 2021/0359556 | A1* | 11/2021 | Bossetti | G01D 5/24 |
| 2021/0384754 | A1* | 12/2021 | Xu | H01F 7/02 |
| 2021/0398733 | A1* | 12/2021 | Moussaoui | H01F 3/10 |
| 2021/0399577 | A1* | 12/2021 | Qiu | H01F 38/14 |
| 2021/0408826 | A1* | 12/2021 | Liu | G06F 1/266 |
| 2022/0006327 | A1* | 1/2022 | Mehrabi | H02J 50/50 |
| 2022/0021247 | A1* | 1/2022 | Partovi | H02J 50/402 |
| 2022/0042643 | A1* | 2/2022 | Rasmussen | H02J 7/0042 |
| 2022/0045398 | A1* | 2/2022 | Havskjold | H01F 27/36 |
| 2022/0045527 | A1* | 2/2022 | Karanikos | H01F 27/366 |
| 2022/0069601 | A1* | 3/2022 | Wu | H02J 7/0045 |

(56) References Cited

U.S. PATENT DOCUMENTS

| | | | |
|---|---|---|---|
| 2022/0077723 A1* | 3/2022 | Patel | H04B 5/79 |
| 2022/0077724 A1* | 3/2022 | Patel | H02J 50/90 |
| 2022/0087389 A1* | 3/2022 | Wulff | H01F 7/0252 |
| 2022/0094201 A1* | 3/2022 | Haug | H02J 50/005 |
| 2022/0094202 A1* | 3/2022 | Karanikos | H02J 50/402 |
| 2022/0096923 A1* | 3/2022 | O'Leary | A63F 13/92 |
| 2022/0102995 A1* | 3/2022 | Fieldbinder | H02J 7/00036 |
| 2022/0115880 A1* | 4/2022 | Partovi | H02J 50/10 |
| 2022/0115908 A1* | 4/2022 | Partovi | H02J 50/05 |
| 2022/0115909 A1* | 4/2022 | Partovi | H02J 7/0047 |
| 2022/0123786 A1* | 4/2022 | Partovi | H01F 38/14 |
| 2022/0166868 A1 | 5/2022 | Whitten et al. | |
| 2022/0173616 A1* | 6/2022 | Partovi | G06F 1/1635 |
| 2022/0181911 A1* | 6/2022 | Partovi | H02J 7/0047 |
| 2022/0200339 A1* | 6/2022 | Alam | H02J 50/12 |
| 2022/0200345 A1* | 6/2022 | Alam | H02J 50/12 |
| 2022/0200360 A1* | 6/2022 | Alam | H01F 38/14 |
| 2022/0203103 A1* | 6/2022 | Hernandez | H02J 50/10 |
| 2022/0255369 A1* | 8/2022 | Partovi | H02J 50/70 |
| 2022/0263345 A1* | 8/2022 | Lin | H01F 7/0221 |
| 2022/0285988 A1* | 9/2022 | Partovi | H02J 50/05 |
| 2022/0311286 A1* | 9/2022 | Schwartz | H02J 50/005 |
| 2022/0311287 A1* | 9/2022 | Yin | H02J 50/10 |
| 2022/0320903 A1* | 10/2022 | Lee | H02J 7/0044 |
| 2022/0336143 A1* | 10/2022 | Xu | H01F 3/10 |
| 2022/0352753 A1* | 11/2022 | Powell, Jr. | H02J 50/005 |
| 2022/0385106 A1* | 12/2022 | Haug | H02J 50/90 |
| 2022/0393509 A1* | 12/2022 | Partovi | H02J 50/70 |
| 2022/0407354 A1* | 12/2022 | Louis | H02J 7/00032 |
| 2022/0407355 A1* | 12/2022 | Brzezinski | H02J 7/0042 |
| 2022/0407356 A1* | 12/2022 | Brzezinski | H02J 50/10 |
| 2022/0416577 A1* | 12/2022 | Alam | H02J 50/005 |
| 2022/0416587 A1* | 12/2022 | Alam | H01F 27/2823 |
| 2022/0416590 A1* | 12/2022 | Rasmussen | H01F 7/0247 |
| 2023/0059432 A1* | 2/2023 | Shi | H02J 50/80 |
| 2023/0111931 A1* | 4/2023 | Luzinski | H01F 38/14 307/142 |
| 2023/0113818 A1* | 4/2023 | Alam | H02J 50/005 307/142 |
| 2023/0115971 A1* | 4/2023 | Luzinski | H01F 27/2823 307/142 |
| 2023/0116360 A1* | 4/2023 | Alam | H02J 50/70 307/104 |
| 2023/0163632 A1* | 5/2023 | Partovi | H02J 50/10 320/108 |
| 2023/0216544 A1* | 7/2023 | Partovi | H02J 5/00 307/104 |
| 2023/0231417 A1* | 7/2023 | Partovi | H02J 7/0047 320/108 |
| 2023/0336036 A1* | 10/2023 | Larsson | H02J 50/10 |
| 2023/0336037 A1* | 10/2023 | Thompson | H04B 5/72 |
| 2023/0361632 A1* | 11/2023 | Larsson | H04B 5/26 |
| 2023/0420988 A1* | 12/2023 | Moussaoui | H02J 50/10 |
| 2024/0030744 A1* | 1/2024 | Luzinski | H01F 38/14 |
| 2024/0087803 A1* | 3/2024 | Spinella | H01F 27/366 |
| 2024/0088714 A1* | 3/2024 | Louis | H01F 38/14 |
| 2024/0179233 A1* | 5/2024 | Whitten | F16M 13/00 |
| 2024/0283303 A1* | 8/2024 | Bossetti | G01D 5/24 |
| 2024/0296989 A1* | 9/2024 | Moussaoui | H01F 27/24 |
| 2024/0333042 A1* | 10/2024 | Alam | H01F 27/366 |
| 2024/0348095 A1* | 10/2024 | Alam | H02J 50/60 |
| 2024/0348098 A1* | 10/2024 | Partovi | H02J 50/70 |
| 2024/0380218 A1* | 11/2024 | Fieldbinder | H02J 7/0013 |
| 2025/0015636 A1* | 1/2025 | Qiu | H02J 50/005 |
| 2025/0088217 A1* | 3/2025 | Partovi | H02J 7/00034 |
| 2025/0125656 A1* | 4/2025 | Luzinski | H02J 50/005 |
| 2025/0253719 A1* | 8/2025 | Patel | H02J 50/60 |

FOREIGN PATENT DOCUMENTS

| | | |
|---|---|---|
| JP | 3183355 U | 5/2013 |
| WO | 2012152980 A1 | 11/2012 |

OTHER PUBLICATIONS

Application No PCT/US2022/029246, International Search Report, Mailed on Jan. 5, 2023, 4 pages.

"Office Action," mailed Feb. 13, 2024 in Korean Application No. 1020220065980. 9 pages (English translation).

First Examination Report issued in India Application No. IN202214030570, dated Mar. 26, 2025 in 7 pages.

* cited by examiner

WIRELESS POWER SYSTEMS WITH MAGNETIC ALIGNMENT SYSTEMS

This application claims the benefit of provisional patent application No. 63/213,923, filed Jun. 23, 2021, which is hereby incorporated by reference herein in its entirety.

FIELD

This relates generally to power systems, and, more particularly, to wireless power systems for charging electronic devices.

BACKGROUND

In a wireless charging system, a wireless power transmitting device uses a wireless power transmitting coil to transmit wireless power signals to a wireless power receiving device. The wireless power receiving device has a coil and rectifier circuitry. The coil of the wireless power receiving device receives alternating-current wireless power signals from the wireless power transmitting device. The rectifier circuitry converts the received signals into direct-current power.

SUMMARY

A wireless power system has electronic devices that mate with each other to transfer wireless power. Each device has wireless power circuitry. The wireless power circuitry includes a wireless power coil coupled to an inverter for transmitting wireless power and/or a rectifier for receiving wireless power.

To transfer power wirelessly between devices in the system, a pair of devices may be mated so that the coils of these devices are aligned with each other. Alignment magnets are used to magnetically attach the mated devices to each other so that coils in the devices are aligned.

The system may include first, second, and third devices. The first and third devices may have fixed alignment magnets with opposite magnetic polarities. The opposing polarities of the poles of the alignment magnets in the first and third devices allow the first and third devices to be magnetically attached to each other.

The second device may have a reconfigurable alignment magnet. The reconfigurability of the alignment magnet may be provided using magnetic structures that move vertically in and out of the second device parallel to a surface normal of the housing of the second device, by magnets that rotate, and/or by other movable magnetic elements. The reconfigurable alignment magnet of the second device is operable in a first mode in which the second device is magnetically attached to the first device and a second mode in which the second device is magnetically attached to the third device.

DETAILED DESCRIPTION

Figure 1:
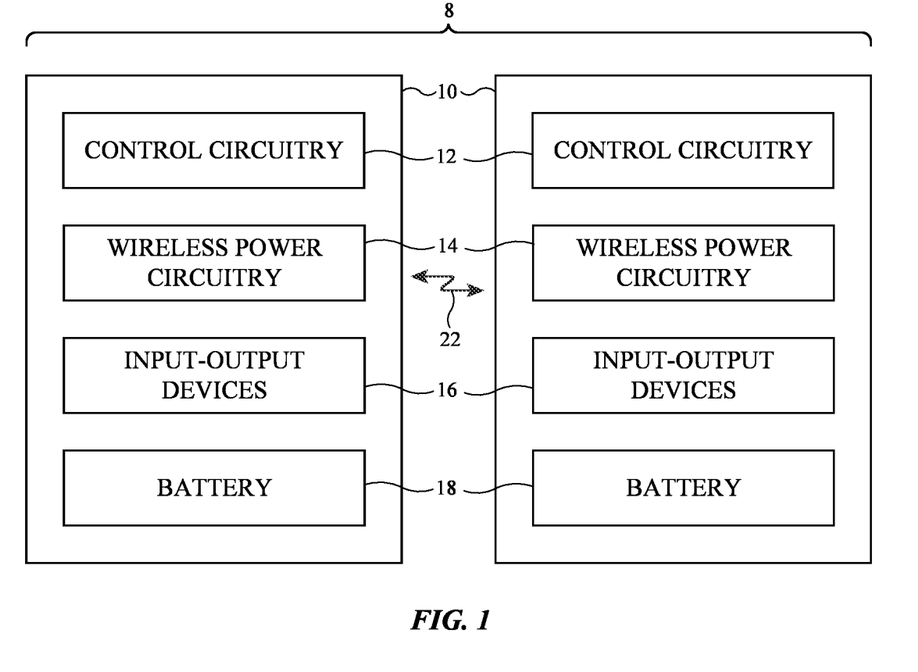
FIG. 1 is a schematic diagram of an illustrative wireless power system in accordance with an embodiment.

A wireless power system includes devices that transmit and/or receive wireless power. An illustrative wireless power system is shown in FIG. 1. As shown in FIG. 1, wireless power system 8 includes multiple devices 10. Devices 10 may include devices such as charging pucks, charging mats, portable electronic devices with power transmitting capabilities, removable supplemental batteries, wrist watches, cellular telephones, tablet computers, laptop computers, removable battery packs, electronic device accessories, and other electronic equipment. Wireless power may be transferred between a transmitting device and a receiving device to charge internal batteries and/or otherwise power internal circuitry in the receiving device. Devices 10 may include devices that are operable in both wireless power transmitting and receiving modes and may include devices that are only used for transmitting wireless power or only used for receiving wireless power.

Devices 10 may include control circuitry 12 for use in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 10. For example, the processing circuitry may be used in processing user input, handling negotiations between devices, sending and receiving power measurements, making measurements, estimating power losses, determining power transmission levels, and otherwise controlling the operation of system 8.

Control circuitry 12 may be configured to perform operations in system 8 using hardware (e.g., dedicated hardware or circuitry), firmware and/or software. Software code for performing operations in system 8 and other data is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 12. The processing circuitry may include application-specific integrated circuits with processing circuitry, one or more microprocessors, a central processing unit (CPU) or other processing circuitry.

Exemplary devices 10 include wireless power circuitry 14 for conveying wireless power signals 22 between devices 10. For example, a first device may have circuitry 14 that transmits alternating-current electromatic signals that are received by circuitry 14 in a second device.

Devices 10 may include input-output devices 16. Devices 16 may include sensors, buttons, and other components for making environmental measurements and for gathering user input. Devices 16 may also include displays, speakers, and other output devices for providing a user with output. If desired, some or all of devices 16 may be omitted from a given electronic device in system 8 (e.g., to reduce cost and complexity for the given device).

Some devices 10 may include batteries 18. During operation, devices 10 may optionally receive power from wired connections for charging batteries 18 and powering other internal circuitry. For example, devices 10 may optionally include ports that receive direct-current power from wired sources such as external alternating-current-to-direct-current converters and/or devices 10 may optionally include ports that receive alternating-current power that is subsequently converted to direct-current power with internal alternating-current-to-direct-current converter circuitry.

Figure 2:
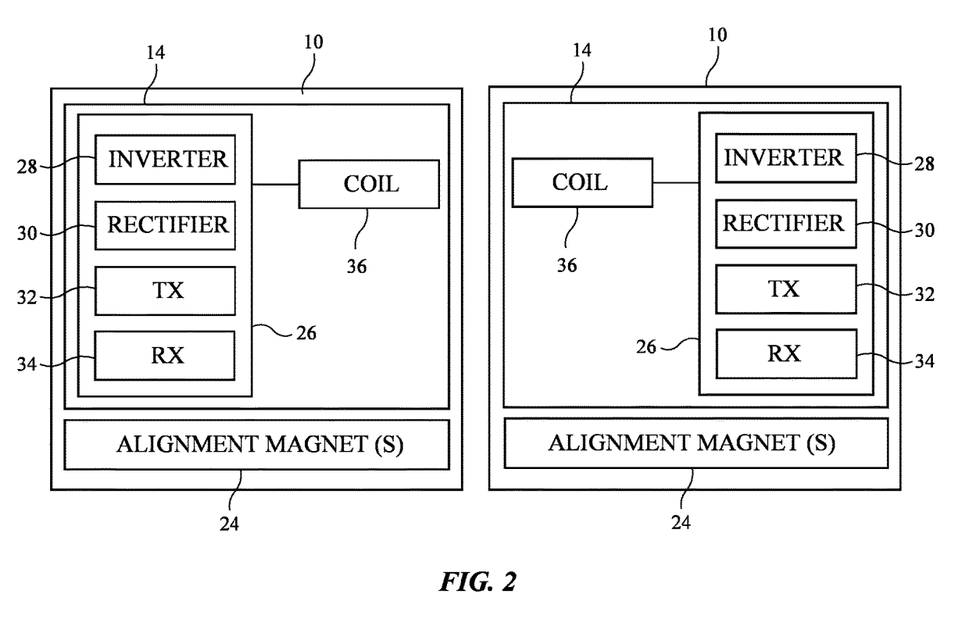
FIG. 2 is a schematic diagram of illustrative wireless power circuitry in a pair of mated electronic devices in accordance with an embodiment.

As shown in FIG. 2, wireless power circuitry 14 may include wireless power coils 36 coupled to corresponding power and communications circuitry 26.

There may be one or more coils 36 in each device 10. For example, devices 10 may each include a single coil and/or one or more devices 10 in system 8 may include multiple coils 36. In arrangements in which devices 10 have more than one coil 36, coils 36 may be arranged in a two-dimensional array (e.g., a two-dimensional array of overlapping coils that cover a charging surface) and/or may be stacked on top of each other (e.g., to allow wireless signals to be transmitted and/or received on opposing sides of a device). To facilitate transmission of wireless power between a first device and a second device, the coils of the first and second devices may be placed adjacent to each other (e.g., a coil in the first device may overlap and be aligned with a corresponding coil in a second device).

Power and communications circuitry 26 may include inverters 28 and rectifiers 30. Circuitry 26 may also include communications circuitry such as transmitters 32 and receivers 34.

When it is desired to transmit power wirelessly, the inverter 28 in a transmitting device provides alternating-current signals (currents) to a corresponding coil 36 in the transmitting device. These alternating-current signals may have frequencies of 50 kHz to 1 MHz, at least 100 kHz, less than 500 kHz, or other suitable frequency. As alternating-current signals flow through the coil 36 in the transmitting device, alternating-current electromagnetic signals (e.g., magnetic fields) are generated and are received by an adjacent coil 36 in a receiving device. This induces alternating-current signals (currents) in the coil 36 of the receiving device that are rectified into direct-current power by a corresponding rectifier 30 in the receiving device. In arrangements in which devices 10 have both inverters and rectifiers, bidirectional power transfer is possible. Each device can transmit power using its inverter or may receive power using its rectifier.

Transmitters 32 and receivers 34 may be used for wireless communications. In some embodiments, out-of-band communications (e.g., Bluetooth® communications, NFC, and/or other wireless communications using radio-frequency antennas in one or more radio-frequency communications bands may be supported). In other embodiments, coils 36 may be used to transmit and/or receive in-band communications data.

Any suitable modulation scheme may be used to support in-band communications, including analog modulation, frequency-shift keying (FSK), amplitude-shift keying (ASK), and/or phase-shift keying (PSK). In an illustrative embodiment, FSK communications and ASK communications are used in transmitting in-band communications traffic between devices 10 in system 8. A wireless power transmitting device may, as an example, use its transmitter 32 to impose frequency shifts onto the alternating-current signals being supplied by its inverter 28 to its coil 36 during wireless power transfer operations and a wireless power receiving device may use its coil 36 and its receiver 34 to receive these FSK signals. The receiving device in this scenario may use its transmitter 32 to modulate the impedance of its coil 36, thereby creating corresponding changes in the current flowing through the wireless power transmitting device coil that are detected and demodulated using the receiver 34 in the wireless power transmitting device. In this way, the transmitter 32 in the wireless power receiving device can use ASK communications to transmit in-band data to the receiver 34 in the wireless power transmitting device while wireless power is being conveyed from the wireless power transmitting device to the wireless power receiving device, to achieve feedback control of power levels. In some embodiments, some devices 10 have both transmitters 32 and receivers 34 and other devices 10 have only transmitters 32 or have only receivers 34.

To ensure satisfactory wireless power transfer operations, devices 10 may have alignment magnets 24. The housings of devices 10 may be formed from metal, polymer, glass, and/or other materials trough which direct-current magnetic fields from permanent magnets such as alignment magnets 24 may pass. Alignment magnets 24 can be used to help ensure alignment between coils 36 in paired (mated) devices. Magnets 24 may have ring shapes or other suitable shapes and may each include one more permanent magnets with magnetic poles in locations that facilitate alignment and attachment of devices 10 to each other. As an example, magnets 24 may be configured so that when the magnet 24 in a first device is magnetically attached to a corresponding magnet 24 in a second device, the coil of the first device will be overlapped by and aligned with the coil of the second device.

If desired, devices 10 may be provided with foreign object detection capabilities. for example, devices 10 may monitor the impedance of coils 36 to detect when a foreign object is overlapping coils 36 (e.g., using pattern detection techniques in embodiments in which coils 36 are arranged in arrays), devices 10 may use temperature sensors, capacitive sensors, ultrasonic sensors, optical sensors, and/or other sensors to detect when a foreign object is present, and/or devices 10 may use power counting schemes to monitor for undesired power loss during wireless power transmission due to the presence of foreign objects.

A user of system 8 may pair devices 10 in a variety of different ways. Consider, as an example, a system with three devices 10A, 10B, and 10C, each of which has a respective coil 36 for use in transferring wireless power. A first of the three devices (e.g., device 10A) may be, for example, a cellular telephone, wristwatch, tablet computer, or other portable electronic device. A second of the three devices (e.g., device 10B) may be an accessory such as a removable battery pack (e.g., a battery pack that is part of a removable enclosure for the first device or that has a planar housing wall or other housing structure that allows the second device to be magnetically and/or mechanically coupled to the first device to supply supplemental battery power to the first device). A third of the three devices (e.g., device 10C) may be a wireless charging puck.

Figure 3:
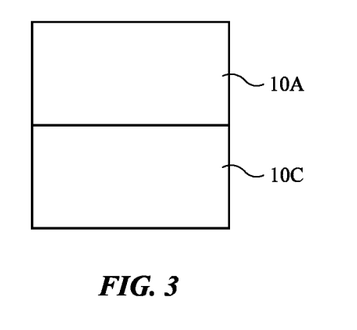
FIG. 3 is a diagram of a first device mated to a third device in an illustrative system in accordance with an embodiment.
Figure 4:
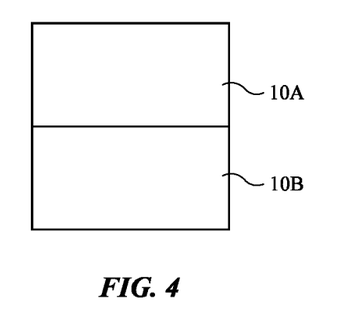
FIG. 4 is a diagram of the first device mated to a second device in an illustrative system in accordance with an embodiment.

In a first scenario, the user may mate device 10A to device 10C as shown in FIG. 3. This allows device 10A to be wirelessly charged by device 10C. In a second scenario, the user may mate device 10A to device 10B as shown in FIG. 4. This allows device 10B to wirelessly provide supplemental battery power to device 10A and may optionally allow device 10A to wirelessly transfer power to device 10B (e.g., to charge a battery in device 10B). In a third scenario, the user may mate device 10C to device 10B. This allows device 10C to wirelessly charge device 10B.

Figure 5:
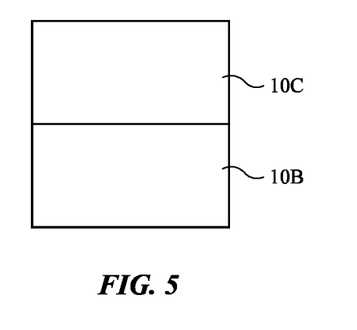
FIG. 5 is a diagram of the third device mated to the second device in an illustrative system in accordance with an embodiment.

Alignment magnets 24 in devices 10A, 10B, and 10C are configured to permit each of the pairing scenarios of FIGS. 3, 4, and 5. In an illustrative arrangement, devices 10A and 10C have fixed alignment magnets 24 and device 10B has a reconfigurable alignment magnet 24 with moving magnetic structures. The fixed alignment magnet 24 of device 10A has a fixed pattern of magnetic poles and the fixed alignment magnet 24 of device 10C has a corresponding fixed pattern of magnetic poles of opposite magnetic polarities. This allows devices 10A and 10C to magnetically attach to each other when the housing walls of devices 10A and 10C are placed next to each other. The reconfigurable alignment magnet of device 10B reconfigures itself so that it can mate with either device 10A (using a first magnetic pole arrangement) or device 10C (using a second magnetic pole arrangement that is different than the first magnetic pole arrangement). By providing device 10B with alignment magnet structures that can reconfigure to accommodate mating with different patterns of fixed alignment magnets, the use of device 10B need not be restricted to devices 10 with a particular fixed pattern of alignment magnet poles.

Figure 6:
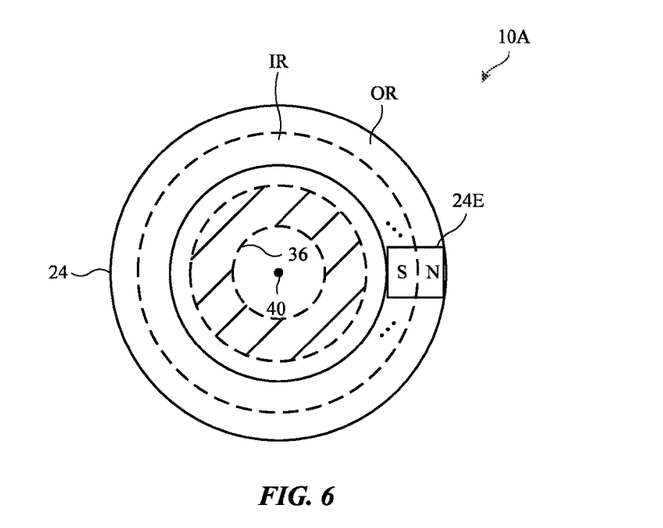
FIG. 6 is a top view of an illustrative coil and alignment magnet for the first device in accordance with an embodiment.

FIG. 6 is a top view of an illustrative alignment magnet for device 10A (e.g., a view of the alignment magnet of device 10A from the rear of device 10A). As shown in FIG. 6, alignment magnet 24 of device 10A has multiple magnetic elements (magnets) 24E arranged in a ring about axis 40. This forms concentric inner and outer magnet rings with opposite magnetic poles in magnet 24. Coil 36 may be concentric with the rings of magnet 24 (e.g., coil 36 may have a center aligned with axis 40). In the example of FIG. 6, coil 36 is surrounded by the ring of magnet 24. Other placements for coil 36 relative to magnet 24 may be used, if desired.

Ring-shaped magnet 24 of FIG. 6 has an inner ring IR of a first magnetic polarity (south in the example of FIG. 6) and an outer ring OR of a second magnetic polarity (north in the example of FIG. 6). This static alignment magnet polarity pattern allows device 10A to magnetically attach to device 10C, which has a corresponding static ring-shaped alignment magnet 24 with poles of opposite polarity (see, e.g., magnet 24 of FIG. 7, in which inner and outer sets of vertical magnets are arranged in concentric circles so that inner ring IR has an exposed pole of north polarity and outer ring OR has an exposed pole of south polarity).

Figure 7:
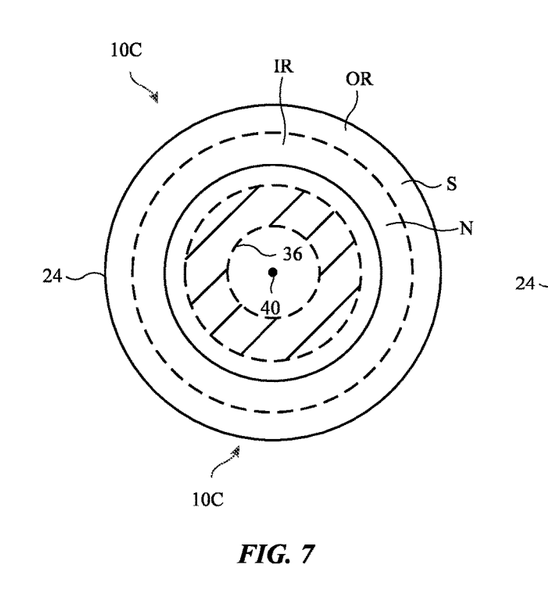
FIG. 7 is a top view of an illustrative alignment magnet for the third device in accordance with an embodiment.
Figure 8:
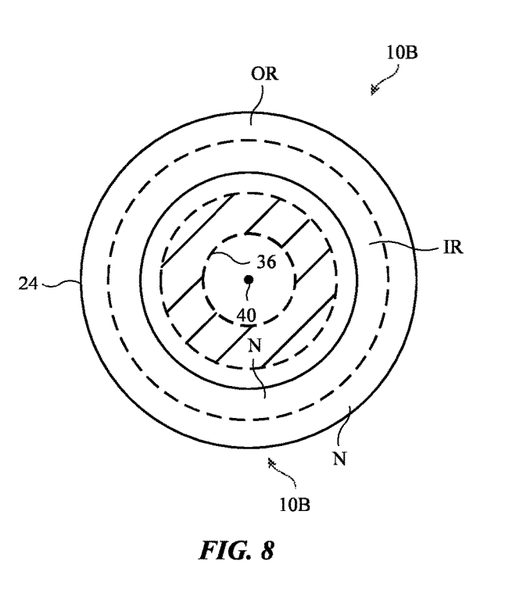
FIG. 8 is a top view of an illustrative reconfigurable alignment magnet for the second device in accordance with an embodiment.

To accommodate mating with both magnet 24 of device 10A of FIG. 6 and magnet 24 of device 10C of FIG. 7, device 10B of FIG. 8 may have an alignment magnet with movable vertical magnet rings or other reconfigurable magnets (sometimes referred to as a reconfigurable alignment magnet, a reconfigurable magnet, a reconfigurable alignment structure, a reconfigurable magnetic alignment structure, a reconfigurable magnetized alignment structure, a reconfigurable permanently magnetized alignment structure, etc.). As shown in FIG. 8, for example, alignment magnet 24 of device 10B may have an inner ring IR formed from a vertical ring-shaped magnet with an exposed north pole and may have an outer ring OR formed from a separate vertical ring-shaped magnet with an exposed north pole. To accommodate mating with both magnet 24 of FIG. 6 (which may sometimes be referred to as an alignment magnet, an alignment structure, a magnetic alignment structure, a magnetized alignment structure, a permanently magnetized alignment structure, etc.) and magnet 24 of FIG. 7 (which may also sometimes be referred to as an alignment magnet, an alignment structure, a magnetic alignment structure, a magnetized alignment structure, a permanently magnetized alignment structure, etc.), the inner and outer magnet rings of magnet 24 of FIG. 8 may move up and down parallel to axis 40 (e.g., parallel to the surface normal of the housing wall of device 10B that covers magnet 24 and coil 36).

Figure 9:
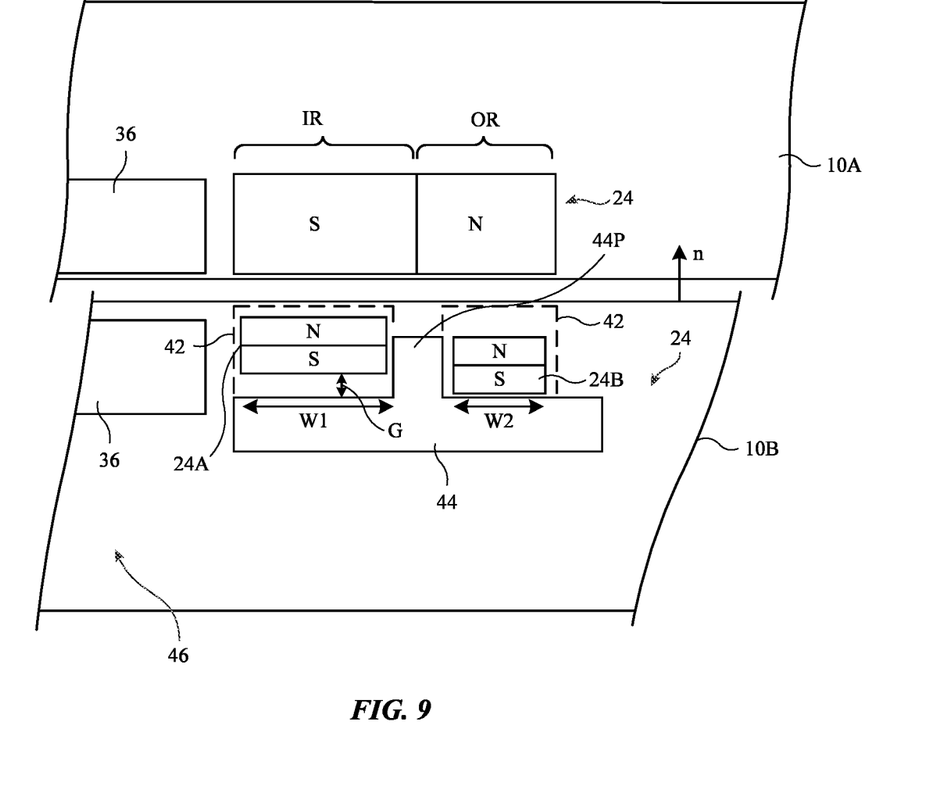
FIG. 9 is a cross-sectional side view of the first device mated to the second device in an illustrative configuration in which the second device has magnets that shift position vertically in accordance with an embodiment.

A cross-sectional side view of device 10A and device 10B showing how alignment magnet 24 of device 10B may be magnetically attached to alignment magnet 24 of device 10A is shown in FIG. 9. As shown in FIG. 9, inner rings IR and outer rings OR in magnets 24 may surround coils 36 in devices 10A and 10B, respectively. In this way, attachment of magnet 24 of device 10A to magnet 24 of device 10B ensures that the coils in these devices will be aligned. Batteries and/or other components may be mounted in interior region 46 of device 10B overlapping coil 36 of device 10B (as an example).

Magnet 24 of device 10A, which may sometimes be referred to as a horizontal magnet because its poles lie in a horizontal plane parallel to the rear housing wall of device 10A, has a fixed pole pattern. Inner ring IR has south (S) magnetic polarity and outer ring OR has north (N) magnetic polarity. (It will be appreciated that the illustrative assignments of N and S in FIG. 9 and elsewhere in this description are arbitrary and that the S and N poles may be swapped in system 8 with no loss in generality.)

Magnet 24 of device 10B has a movable inner ring 24A formed from a vertical magnet with an outwardly facing north pole N and an inwardly facing pole S and a movable outer ring 24B formed from a vertical magnet with an outwardly facing north pole N and an inwardly facing south pole S. Magnetic shunt 44 may be formed from magnetic material (e.g., one or more steel members or other structures formed from ferromagnetic or ferrimagnetic material). Shunt 44 may overlap the inwardly facing poles of magnet rings 24A and 24B and may have a portion such as portion 44P that extends between rings 24A and 24B. Mounting structures 42 may permit inner ring 24A and outer ring 24B to move toward and away from device 10A vertically (in and out of device 10B parallel to surface normal n of the wall of the housing of device 10B) while constraining the positions of rings 24A and 24B (e.g., to prevent rings 24A and 24B from moving laterally while permitting a predetermined amount of vertical motion).

When the exposed magnetic pole of a magnet ring has opposite polarity to that of the overlapping pole of magnet 24 in device 10A, the magnet ring will be attracted towards device 10A and will move towards device 10A. As shown in the example of FIG. 9, the north polarity of the exposed pole of ring 24A is opposite to the south polarity of inner ring IR of magnet 24 in device 10A, so ring 24A moves towards inner ring IR, creating a gap G between shunt 44 and the inwardly facing surface of magnet ring 24A. The exposed magnetic pole of outer magnet ring 24B has the same north polarity as the exposed pole of ring 24A. Because the exposed north pole of ring 24B has the same polarity as the overlapping north pole of outer ring OR of magnet 24 of device 10A, ring 24B will be repelled by magnet 24 of device 10A and will be pushed towards the interior of device 10B. Because of the presence of gap G under ring 24A, ring 24A will be closer to magnet 24 than ring 24B. As a result, the attractive force of ring 24A towards inner ring IR will be greater than the repulsive force of ring 24B away from outer ring OR and magnets 24 of devices 10A and 10B will therefore become magnetically attached to each other to align coils 36 in devices 10A and 10B to each other.

Figure 10:
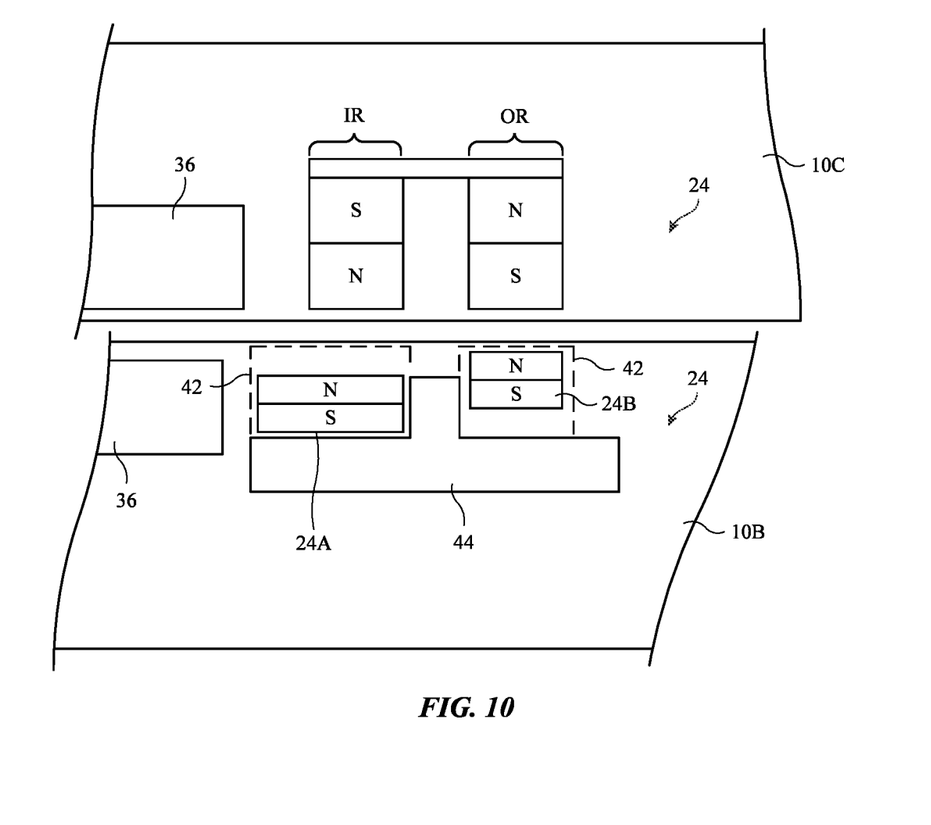
FIG. 10 is a cross-sectional side view of the third device mated to the second device in the illustrative configuration in which the second device has magnets that shift position vertically in accordance with an embodiment.

When device 10B is mated with device 10C instead of device 10A, the moving magnetic elements of magnet 24 of device 10B will rearrange as shown in FIG. 10. As shown in FIG. 10, device 10C may have vertical magnets forming inner ring IR (with an exposed north polarity) and outer ring OR (with an exposed touch polarity). Magnetic shunt 50 may bridge the inwardly-facing poles of these magnets. When device 10B is placed in alignment with device 10C, the exposed north pole of magnet ring 24A will be repelled by the exposed north pole of inner ring IR of device 10C, whereas the exposed north pole of magnet ring 24B will be attracted by the exposed south pole of outer ring OR of device 10C. In this situation, magnet ring 24B will be closer to magnet 24 of device 10C than magnet ring 24A. The magnetic attraction between ring 24B and ring OR will therefore overwhelm the smaller repulsive force between magnet ring 24B and inner ring IR, thereby allowing magnets 24 of devices 10C and 10B to attach to each other to align coils 36.

The widths and/or other dimensions of magnet rings 24A and 24B may be equal or different. As an example, magnetic attachment of device 10B to device 10A may be enhanced by increasing the width of magnet 24A (e.g., so that width W1 of magnet 24A is greater than width W2 of magnet 24B as shown in FIG. 9) or the shapes and/or sizes of magnet rings 24A and 24B may otherwise differ.

Figure 11:
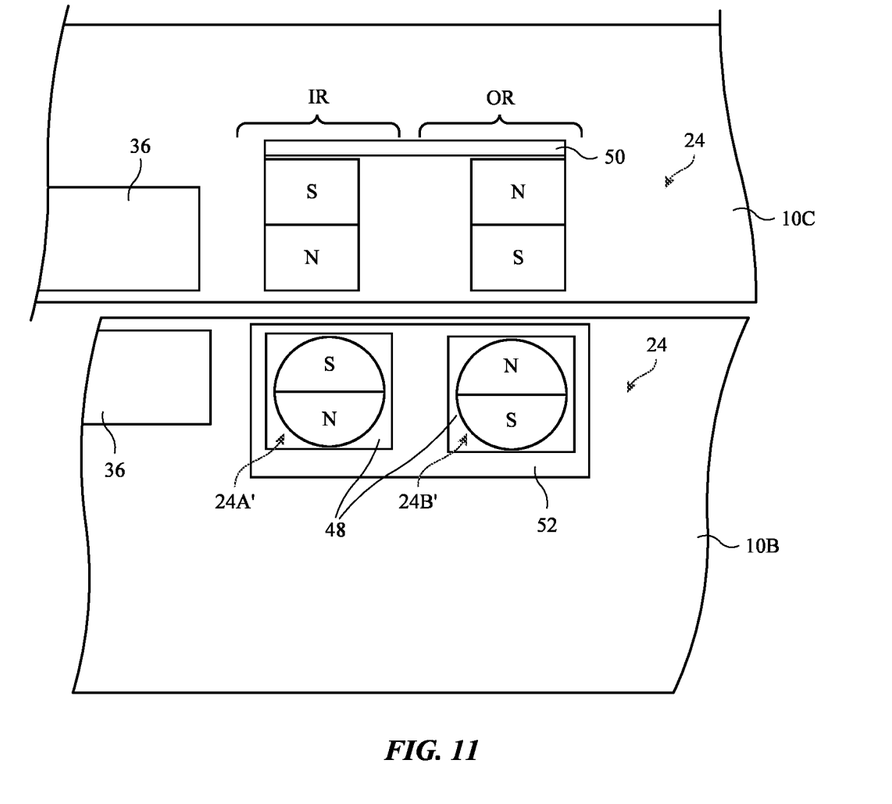
FIG. 11 is a cross-sectional side view of the third device mated to the second device in a configuration in which the second device has magnets that rotate in accordance with an embodiment.
Figure 12:
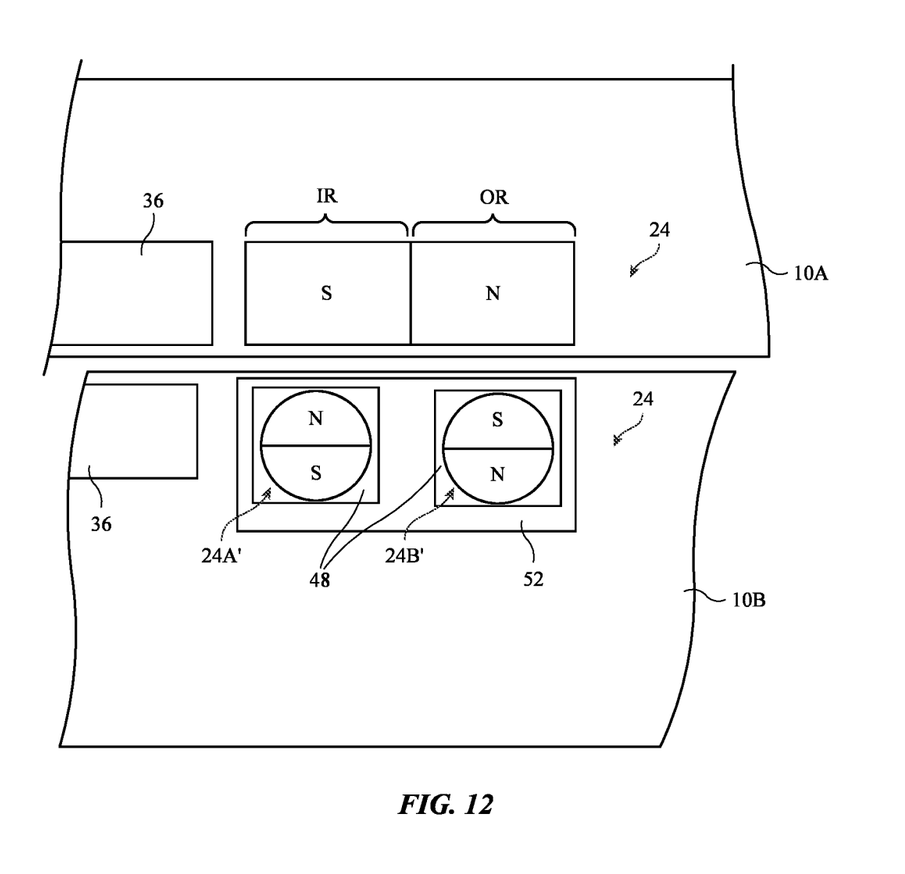
FIG. 12 is a cross-sectional side view of the first device mated to the second device in a configuration in which the second device has magnets that rotate in accordance with an embodiment.

If desired, the magnetic poles of the moving magnet structures of device 10B may rotate or exhibit other motions when reconfiguring that differ from the vertical motion illustrated in FIGS. 9 and 10. As shown in FIGS. 11 and 12, for example, magnet 24 of device 10B may have magnetic elements (magnets) 24A' and 24B' that rotate to expose poles that are opposite in polarity to the exposed poles of mating magnets 24 in devices 10A and 10C. Elements 24A' and 24B' may be arranged in a ring or other pattern surrounding coil 36. Elements 24A' and/or 24B' may be spherical, cylindrical, or other suitable shape. During operation, elements 24A' and/or 24B' may rotate about shafts and/or may otherwise rotate within cavities 48 in support structures 52 to expose magnetic poles that are opposite in polarity of the exposed poles of an associated alignment magnet 24.

As shown in FIG. 11, for example, when device 10C is mated with device 10B, magnets 24A' and 24B' may rotate so that the south pole of magnet 24A' is exposed and is thereby attracted to the exposed north pole of inner ring IR of magnet 24 in device 10C and so that the north pole of magnet 24B' is exposed and is thereby attracted to the exposed south pole of outer ring OR of magnet 24 in device 10C. In this arrangement, magnets 24 of devices 10C and 10B will attract each other, thereby attaching devices 10C and 10B together and aligning coils 36.

Magnet 24 of device 10B of FIG. 11 will reconfigure when device 10B is mated with device 10A instead of device 10C, as shown in FIG. 12. In particular, the inner ring rotatable magnetic elements 24A' will rotate so that their north poles will be attracted to the exposed south pole of inner ring IR of magnet 24 in device 10A and the outer ring rotatable magnetic elements 24B' will rotate so that their south poles will be attracted to the exposed north pole of outer ring 24B of magnet 24 in device 10A. In this way, magnets 24 of devices 10A and 10B will be attracted to each other to attach devices 10A and 10B together with coils 36 in alignment with each other.

The foregoing is merely illustrative and various modifications can be made to the described embodiments. The foregoing embodiments may be implemented individually or in any combination.

What is claimed is:

1. An electronic device operable to magnetically attach to a first device with a first magnetic alignment structure and to magnetically attach to a second device with a second magnetic alignment structure that is configured to magnetically attach to the first magnetic alignment structure, the electronic device comprising:
    wireless power circuitry including a coil;
    a reconfigurable magnetic alignment structure comprising a movable inner ring that surrounds the coil and a movable outer ring that surrounds the movable inner ring; and
    a housing wall that overlaps the reconfigurable magnetic alignment structure, wherein the reconfigurable magnetic alignment structure is operable in:
    1) a first mode in which the reconfigurable magnetic alignment structure is configured to magnetically attach to the first magnetic alignment structure, the housing wall is interposed between the reconfigurable magnetic alignment structure and the first device, the moveable inner ring is attracted by the first magnetic alignment structure towards the housing wall, and the moveable outer ring is repelled by the first magnetic alignment structure away from the housing wall; and
    2) a second mode in which the reconfigurable magnetic alignment structure is configured to magnetically attach to the second magnetic alignment structure, the housing wall is interposed between the reconfigurable magnetic alignment structure and the second device, the moveable inner ring is repelled by the second magnetic alignment structure away from the housing wall, and the moveable outer ring is attracted by the second magnetic alignment structure towards the housing wall.

2. The electronic device of claim 1 wherein the movable inner ring comprises a first magnetic pole of a first magnetic polarity and a second magnetic pole of a second magnetic polarity and wherein the movable outer ring comprises a third magnetic pole with the first magnetic polarity and a fourth magnetic pole of the second magnetic polarity and wherein, in the first mode, the first magnetic pole is interposed between the second magnetic pole and the first magnetic alignment structure and the third magnetic pole is interposed between the fourth magnetic pole and the first magnetic alignment structure.

3. The electronic device of claim 1 further comprising mounting structures that:
permit the movable inner ring and the movable outer ring to each independently move parallel to a surface normal of the housing wall; and
constrain the movable inner ring and the movable outer ring from moving orthogonally to the surface normal of the housing wall.

4. The electronic device of claim 1 further comprising a magnetic shunt, wherein the movable inner ring and the movable outer ring overlap the magnetic shunt.

5. The electronic device of claim 4 wherein a portion of the magnetic shunt extends between the movable inner ring and the movable outer ring.

6. The electronic device of claim 1 wherein the first device has a first device wireless power coil, wherein the first magnetic alignment structure surrounds the first device wireless power coil, wherein the second device has a second device wireless power coil, and wherein the second magnetic alignment structure surrounds the second device wireless power coil.

7. The electronic device of claim 6 wherein the reconfigurable magnetic alignment structure is configured to align the coil of the wireless power circuitry to the first device wireless power coil when the reconfigurable magnetic alignment structure is magnetically attached to the first magnetic alignment structure in the first mode.

8. The electronic device of claim 7 wherein the reconfigurable magnetic alignment structure is configured to align the coil of the wireless power circuitry to the second device wireless power coil when the reconfigurable magnetic alignment structure is magnetically attached to the second magnetic alignment structure in the second mode.

9. The electronic device of claim 1 further comprising a battery that is configured to receive power from the wireless power circuitry.

10. The electronic device of claim 9 wherein the wireless power circuitry comprises a rectifier configured to rectify alternating-current signals received from the coil.

11. The electronic device of claim 10 wherein the wireless power circuitry comprises an inverter configured to provide alternating-current signals to the coil.

* * * * *